(12) United States Patent
Lynch et al.

(10) Patent No.: US 6,905,250 B2
(45) Date of Patent: Jun. 14, 2005

(54) THRUST ROLLER BEARING ASSEMBLY

(75) Inventors: John J. Lynch, Goshen, CT (US);
Edward P. Butler, III, Torrington, CT (US); Edward C. Axler, Torrington, CT (US)

(73) Assignee: Timken US Corporation, Torrington, CT (US)

( * ) Notice: Subject to any disclaimer, the term of this patent is extended or adjusted under 35 U.S.C. 154(b) by 206 days.

(21) Appl. No.: 10/353,679

(22) Filed: Jan. 29, 2003

(65) Prior Publication Data

US 2004/0146233 A1 Jul. 29, 2004

(51) Int. Cl.[7] ............................................. F16C 33/46
(52) U.S. Cl. ...................................................... 384/621
(58) Field of Search .................... 384/621, 622, 384/623, 620, 615

(56) References Cited

FOREIGN PATENT DOCUMENTS

| DE | 196 11 065 A1 | 9/1997 |
|---|---|---|
| GB | 1 482 289 | 8/1977 |

*Primary Examiner*—Lenard A. Footland
(74) *Attorney, Agent, or Firm*—Michael Best & Friedrich LLP

(57) ABSTRACT

A thrust bearing assembly including a plurality of rollers having a given diameter d, a cage assembly configured to support the rollers, the cage assembly having a first radial edge that extends a given radial distance X beyond the rollers, and at least one thrust race member. The thrust race member includes a radial race surface, a radial flange extending from the race surface, and a radial lip extending from the flange. The lip is substantially parallel to and at a distance less than the given diameter d from the race surface. The lip has a free end at a distance from the flange greater than the given distance X.

20 Claims, 2 Drawing Sheets

THRUST ROLLER BEARING ASSEMBLY

BACKGROUND

The present invention relates to a thrust roller bearing comprising a cage containing cylindrical rollers or needles arranged in pockets. The cage is positioned adjacent at least one thrust race member such that the rollers or needles contact a radial race surface of the race member. If the rotating cage contacts a stationary race member, it may be subjected to torsional drag loads, pinching or radial loads, and other fatigue, such as cutting or grinding wear.

SUMMARY

The present invention provides a thrust bearing assembly including a plurality of rollers having a given diameter d, a cage assembly configured to support the rollers, the cage assembly having a first radial edge that extends a given radial distance X beyond the rollers, and a first thrust race member including a radial race surface, a radial flange extending from the race surface, and a radial lip extending from the flange such that the lip is substantially parallel to and at a distance less than the given diameter d from the race surface, the lip having a free end at a distance from the flange greater than the given distance X.

The assembly may further comprise a second thrust race member including a radial race surface substantially opposite the first thrust race member race surface. The cage assembly has a second radial edge opposed to the first radial edge, the second radial edge extending a given radial distance Y beyond the rollers and the second thrust race member including a radial flange extending from the second thrust race member race surface and a radial lip extending from the second thrust race member flange such that the second thrust race member lip is substantially parallel to and at a distance less than the given diameter d from the second thrust race member race surface, the second thrust race member lip having a free end at a distance from the second thrust race member flange greater than the given distance Y.

DETAILED DESCRIPTION OF THE PREFERRED EMBODIMENTS

The present invention will be described with reference to the accompanying drawing figures wherein like numbers represent like elements throughout. Certain terminology, for example, "top", "bottom", "right", "left", "front", "frontward", "forward", "back", "rear" and "rearward", is used in the following description for relative descriptive clarity only and is not intended to be limiting.

Figure 1:
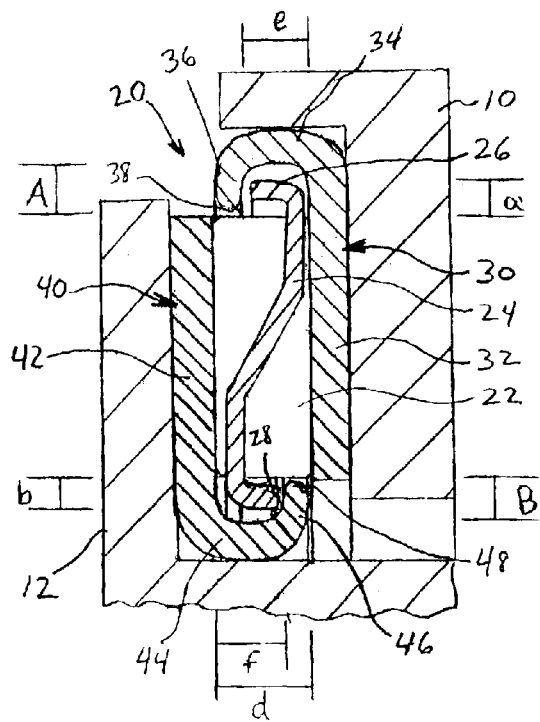
FIG. 1 is a partial cross sectional view of a thrust bearing assembly in accordance with a first embodiment of the present invention.

Referring to FIG. 1, a thrust bearing assembly 20 that is a first embodiment of the present invention is shown. The thrust bearing assembly 20 is shown positioned between a housing 10 and a shaft 12. The housing 10 and shaft 12 arrangement is for illustration purposes only as the thrust bearing assembly 20 may be utilized in various arrangements, including inner or outer piloted arrangements.

The thrust bearing assembly 20 includes a plurality of rollers or needles 22 supported in a cage assembly 24. The roller or needles 22 have a given diameter (d). The cage assembly 24 terminates in opposed ends 26 and 28, with each end extending a given radial distance (a, b), respectively, beyond the rollers 22. In the present embodiment, the cage assembly 24 has a Z-configuration, but other configurations, including two piece cage assemblies, can also be utilized. Additionally, the illustrated cage assembly 24 does not include means to retain the rollers 22, however, the cage assembly may be provided with such.

The rollers or needles 22 are in contact with a first thrust race member 30 and a second thrust race member 40. The race members 30 and 40 include opposed radial race surfaces 32 and 42, respectively. The first thrust race member 30 includes a radial flange 34 extending from the race surface 32 toward the rollers 22. The flange 34 preferably extends perpendicular to the race surface 32, but may be otherwise oriented. A radial lip 36 extends from the flange 34 such that the lip 36 is substantially parallel to the race surface 32. The inside edge of the lip 36 is spaced a distance (e) from the race surface 32 that is less than the diameter (d) of the rollers or needles 22 such that at least a portion of the lip 36 overlaps the rollers or needles 22. The lip 36 terminates in an end 38. The end 38 is spaced from the flange 34 a distance (A) that is greater than the distance (a) the respective cage edge 26 extends beyond the rollers or needles 22. As such, the rollers or needles 22 will bear against the lip end 38 and will prevent the cage edge 26 from contacting the thrust race member 30. The lip end 38 may be contoured, for example, rounded, to minimize wear against the rollers or needles 22.

In the present embodiment of the thrust bearing assembly 20, the second thrust race member 40 includes a radial flange 44 extending from the race surface 42 toward the rollers 22. The flange 44 preferably extends perpendicular to the race surface 42, but may be otherwise oriented. A radial lip 46 extends from the flange 44 such that the lip 46 is substantially parallel to the race surface 42. The inside edge of the lip 46 is spaced a distance (f) from the race surface 42 that is less than the diameter (d) of the rollers or needles 22 such that at least a portion of the lip 46 overlaps the rollers or needles 22. The lip 46 terminates in an end 48. The end 48 is spaced from the flange 34 a distance (B) that is greater than the distance (b) the respective cage edge 28 extends beyond the rollers or needles 22. As such, the rollers or needles 22 will bear against the lip end 48 and will prevent the cage edge 28 from contacting the thrust race member 40. The lip end 48 may be contoured, for example, rounded, to minimize wear against the rollers or needles 22.

The thrust race members 30 and 40 are preferably manufactured from formed sheet metal, but may be manufactured from other materials. The race surfaces 32, 42, flanges 34, 44 and the lips 36, 46 are preferably continuous surfaces, but may be provided with apertures, grooves, notches or other passages to provide fluid flow passages or otherwise supplement the bearing performance. Additionally, each thrust race member 30 and 40 is preferably manufactured as an integral member, but may be manufactured as two or more components attached to one another.

Figure 2:
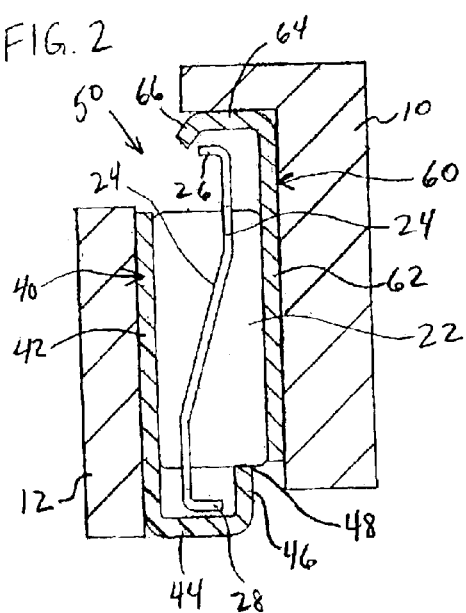
FIG. 2 is a partial cross sectional view of a thrust bearing assembly in accordance with a second embodiment of the present invention.

Referring to FIG. 2, a thrust bearing assembly 50 that is a second embodiment of the present invention is shown. In this embodiment, the cage 24 is configured to pilot along its outer edge 26 with the rollers or needles 22 positioned inward. The inner thrust race member 40 is substantially the same as in the previous embodiment and is shown with its lip end 48 contacting the rollers or needles 22 in a inwardly shifted condition. The outer thrust race member 60 includes a radial race surface 62 with a flange 64 and a lip 66 extending therefrom. The lip 66 is shortened such that the cage edge 26 can contact and pilot off of the outer thrust race member 60.

Figure 3:
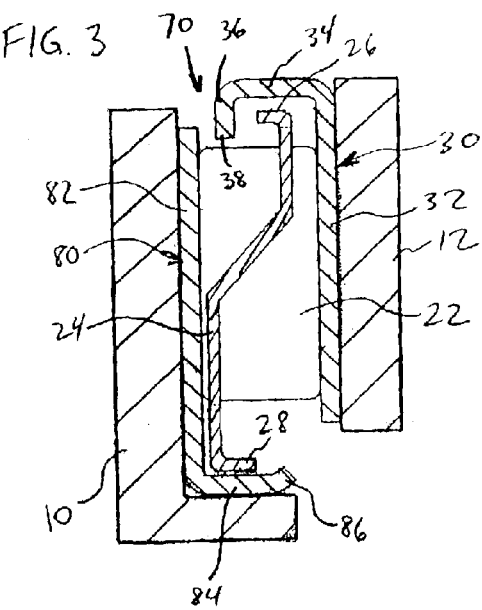
FIG. 3 is a partial cross sectional view of a thrust bearing assembly in accordance with a third embodiment of the present invention.
Figure 4:
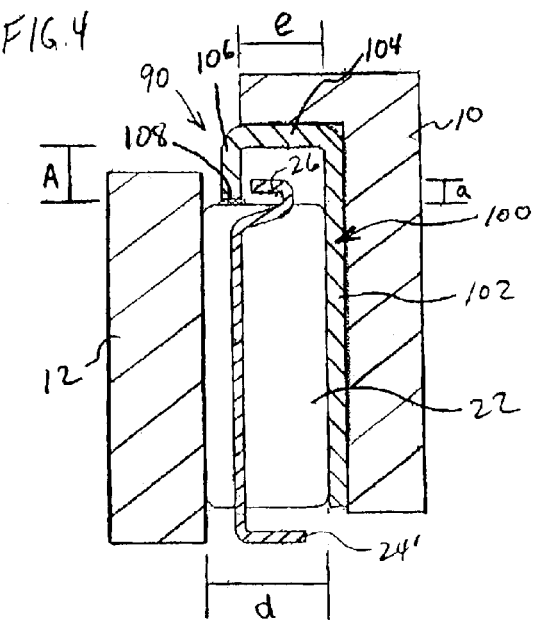
FIG. 4 is a partial cross sectional view of a thrust bearing assembly in accordance with a fourth embodiment of the present invention.
Figure 5:
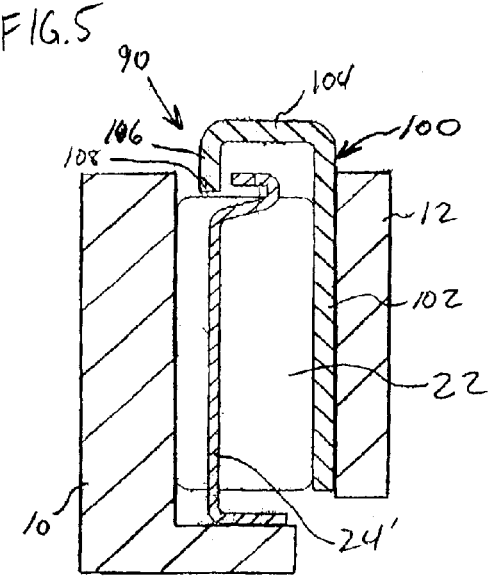
FIGS. 5–7 are partial cross sectional views of a thrust race member in accordance with the fourth embodiment of the present invention utilized in various applications.
Figure 6:
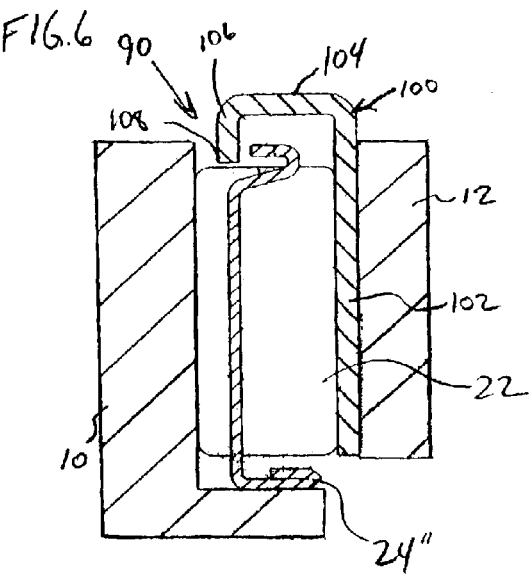
Figure 7:
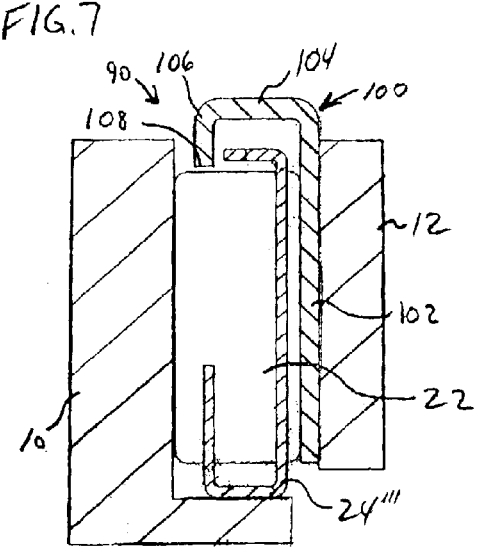

Referring to FIG. 3, a thrust bearing assembly 70 that is a third embodiment of the present invention is shown. In this embodiment, the cage 24 is configured to pilot along its inner edge 28 with the rollers or needles 22 positioned outward. The outer thrust race member 30 is substantially the same as in the first embodiment. The inner thrust race member 80 includes a radial race surface 82 with a flange 84 and a lip 86 extending therefrom. The lip 86 is shortened such that the cage edge 26 can contact and pilot off of the inner thrust race member 80.

Referring to FIGS. 4–7, a thrust bearing assembly 90 that is a fourth embodiment of the present invention is shown in various operating arrangements. The thrust bearing assembly 90 includes a plurality of rollers or needles 22 supported in a cage assembly 24. As can be seen in the FIGS. 4 through 7, respectively, the cage assembly 24', 24", and 24'" may have various configurations. In each of the illustrated arrangements, the thrust bearing assembly 90 has a single thrust race member 100. As illustrated, the thrust race member 100 may be positioned against either the housing 10 or shaft 12 or other utilized component.

The thrust race member 100 includes a radial flange 104 extending from the race surface 102 toward the rollers 22. The flange 104 preferably extends perpendicular to the race surface 102, but may be otherwise oriented. A radial lip 106 extends from the flange 104 such that the lip 106 is substantially parallel to the race surface 102. The inside edge of the lip 106 is spaced a distance (e) from the race surface 102 that is less than the diameter (d) of the rollers or needles 22 such that at least a portion of the lip 106 overlaps the rollers or needles 22. The lip 106 terminates in an end 108. The end 108 is spaced from the flange 104 a distance (A) that is greater than the distance (a) the cage edge 26 extends beyond the rollers or needles 22. As such, the rollers or needles 22 will bear against the lip end 108 and will prevent the cage edge 26 from contacting the thrust race member 100. The lip end 108 may be contoured, for example, rounded, to minimize wear against the rollers or needles 22.

What is claimed is:

1. A thrust bearing assembly comprising
a plurality of rollers having a given diameter d;
a cage assembly configured to support the rollers, the cage assembly having a first radial edge that extends a given radial distance X beyond the rollers; and
a first thrust race member including a radial race surface, a axial flange extending from the race surface, and a radial lip extending from the flange such that the lip is substantially parallel to and at a distance less than the given diameter d from the race surface, the lip having a free end at a distance from the flange greater than the given distance X.

2. The thrust bearing assembly of claim 1 further comprising a second thrust race member including a radial race surface, the second thrust race member race surface being substantially opposite the first thrust race member race surface.

3. The thrust bearing assembly of claim 2 wherein the cage assembly has a second radial edge opposed to the first radial edge, the second radial edge extending a given radial distance Y beyond the rollers; and the second thrust race member including a axial flange extending from the second thrust race member race surface and a radial lip extending from the second thrust race member flange such that the second thrust race member lip is substantially parallel to and at a distance less than the given diameter d from the second thrust race member race surface, the second thrust race member lip having a free end at a distance from the second thrust race member flange greater than the given distance Y.

4. The thrust bearing assembly of claim 3 wherein the first and second thrust race member lip free ends each have a contoured configuration.

5. The thrust bearing assembly of claim 2 wherein the cage assembly has a second radial edge opposed to the first radial edge, the second radial edge extending a given radial distance Y beyond the rollers; and the second thrust race member including a axial flange extending from the second thrust race member race surface and a radial lip extending from the second thrust race member, the second thrust race member lip having a free end at a distance from the second thrust race member flange less than the given distance Y.

6. The thrust bearing assembly of claim 1 wherein the cage has a radial centerline and wherein each roller has a roller centerline and is positioned in the cage with the roller centerline offset outwardly relative to the cage radial centerline.

7. The thrust bearing assembly of claim 1 wherein the cage has a radial centerline and wherein each roller has a roller centerline and is positioned in the cage with the roller centerline offset inwardly relative to the cage radial centerline.

8. The thrust bearing assembly of claim 1 wherein the first thrust race member is positioned against a shaft.

9. The thrust bearing assembly of claim 1 wherein the first thrust race member is positioned against a housing.

10. The thrust bearing assembly of claim 1 wherein the first thrust race member lip free end has a contoured configuration.

11. A thrust bearing assembly comprising
a plurality of rollers;
a cage assembly configured to support the rollers, the cage assembly having a first radial edge that extends beyond the rollers; and
a first thrust race member including a radial race surface, a axial flange extending from the race surface, and a radial lip extending from the flange, the cage assembly and the radial lip configured such that the lip contacts the rollers and prevents the cage first radial edge from contacting the axial flange.

12. The thrust bearing assembly of claim 11 further comprising a second thrust race member including a radial race surface, the second thrust race member race surface being substantially opposite the first thrust race member race surface.

13. The thrust bearing assembly of claim 12 wherein the cage assembly has a second radial edge opposed to the first radial edge and the second thrust race member includes a axial flange extending from the second thrust race member race surface and a radial lip extending from the second thrust race member flange, the cage assembly and the second radial lip configured such that the second radial lip contacts the rollers and prevents the cage second radial edge from contacting the second axial flange.

14. The thrust bearing assembly of claim 13 wherein the first and second thrust race member lip free ends each have a contoured configuration.

15. The thrust bearing assembly of claim 12 wherein the cage assembly has a second radial edge opposed to the first radial edge and the second thrust race member includes a axial flange extending from the second thrust race member race surface and a second radial lip extending from the second thrust race member flange, the cage assembly and the second radial lip configured such that the cage second radial edge is free to pilot on the second axial flange.

16. The thrust bearing assembly of claim 11 wherein the cage has a radial centerline and wherein each roller has a roller centerline and is positioned in the cage with the roller centerline offset outwardly relative to the cage radial centerline.

17. The thrust bearing assembly of claim 11 wherein the cage has a radial centerline and wherein each roller has a roller centerline and is positioned in the cage with the roller centerline offset inwardly relative to the cage radial centerline.

18. The thrust bearing assembly of claim 11 wherein the first thrust race member is positioned against a shaft.

19. The thrust bearing assembly of claim 11 wherein the first thrust race member is positioned against a housing.

20. The thrust bearing assembly of claim 11 wherein the first thrust race member lip free end has a contoured configuration.

* * * * *